(12) United States Patent
Xiang et al.

(10) Patent No.: US 6,574,469 B1
(45) Date of Patent: Jun. 3, 2003

(54) SYSTEM AND METHOD OF MINIMIZING THE NUMBER OF VOICE TRANSCODINGS DURING A CONFERENCE CALL IN A PACKET-SWITCHED NETWORK

(75) Inventors: Zeng-Jun Xiang, Montreal (CA); Eric Turcotte, Verdun (CA)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 09/568,455

(22) Filed: May 9, 2000

(51) Int. Cl.[7] ............................................... H04M 3/42
(52) U.S. Cl. ...................................... 455/416; 370/401
(58) Field of Search ........................ 455/416; 370/328, 370/329, 338, 352, 353, 354, 355, 356, 400, 401, 410, 465, 466, 260, 261, 262

(56) References Cited

U.S. PATENT DOCUMENTS

| | | | | |
|---|---|---|---|---|
| 6,108,560 A | * | 8/2000 | Navaro et al. ............... | 455/517 |
| 6,256,612 B1 | * | 7/2001 | Vo et al. ...................... | 704/500 |
| 6,404,746 B1 | * | 6/2002 | Cave et al. .................. | 370/262 |
| 6,434,606 B1 | * | 8/2002 | Borella et al. .............. | 709/214 |
| 6,466,550 B1 | * | 10/2002 | Foster et al. ................ | 370/261 |
| 6,477,150 B1 | * | 11/2002 | Maggenti et al. ........... | 370/312 |

\* cited by examiner

*Primary Examiner*—Nguyen T. Vo
*Assistant Examiner*—Tu Nguyen
(74) *Attorney, Agent, or Firm*—Smith & Danamraj, PC

(57) ABSTRACT

A system, method and access gateway for minimizing the number of transcodings of a speech signal during a Voice-over-IP (VoIP) conference call in a packet-switched network in which Tandem Free Operation (TFO) is utilized. The system includes a first gateway connecting the first mobile subscriber to the network, a second gateway connecting the second subscriber, and a third gateway connecting the third subscriber. The second gateway sends a message to the first gateway indicating a speech coding mode being utilized between the second gateway and the second subscriber. The third gateway sends a message to the first gateway indicating a speech coding mode being utilized between the third gateway and the third subscriber. When a three-way conference call is initiated, the first gateway encodes the call path to the second subscriber with the speech coding mode being utilized between the second gateway and the second subscriber. The first gateway also encodes the speech signal for the call leg to the third subscriber with the speech coding mode being utilized between the third gateway and the third subscriber.

19 Claims, 4 Drawing Sheets

SYSTEM AND METHOD OF MINIMIZING THE NUMBER OF VOICE TRANSCODINGS DURING A CONFERENCE CALL IN A PACKET-SWITCHED NETWORK

BACKGROUND OF THE INVENTION

1. Technical Field of the Invention

This invention relates to telecommunication systems and, more particularly, to a system and method of minimizing the number of voice transcodings during a conference call in a packet-switched network, such as a Voice-over-IP (VoIP) network, in which Tandem Free Operation (TFO) is utilized to control transcodings of the speech signal to reduce transmission cost and improve speech quality.

2. Description of Related Art

During a call between two Mobile Stations (i.e., an MS-to-MS call) in today's circuit-switched Time Division Multiple Access (TDMA) cellular system, the speech signal is encoded with Algebraic Code Excited Linear Prediction (ACELP) encoding within the originating MS for transmission over the air interface. The signal is decoded to the Pulse Code Modulation (PCM) format within the first associated transcoder, which is typically located in the originating serving Mobile Switching Center (MSC). The PCM signals are then transported within the fixed part of the network to the terminating serving MSC utilizing a G.711 link operating at 64 kbps. A second transcoder in the terminating serving MSC converts the signal back to ACELP for transmission over the air interface to the terminating MS. Thus, there are two codecs in tandem operation in the call path. This degrades the speech quality. Additionally, at 64 kbps, the G.711 transmission requires more bandwidth.

Tandem Free Operation (TFO) is an existing methodology utilized to improve speech quality by using only one transcoder in an MS-to-MS speech path, and to reduce the long distance transmission cost by transmitting ACELP signals all the way through the backbone network. TFO is applicable only to MS-to-MS calls, however, and does not support calls from an MS to a H.323 client. For calls from an MS to a PSTN telephone, TFO utilizes a single speech coding mode (such as ACELP) from the MS all the way to the gateway connected to the PSTN network.

TFO therefore avoids repetitious coding and decoding, and in an MS-to-MS call, transports the encoded ACELP speech all the way from the originating MS to the terminating MS. However, a problem arises when a call has been set up with TFO, and a three-way conference call is then initiated. If MS1 calls MS2, and the conversation is using ACELP all the way from MS1 to MS2, TFO cannot be maintained if MS3 joins in a conference call. The call has to fall back to the G.711 mode in the link from the originating serving MSC1 to the originating gateway (GW1) connecting the call to the packet-switched network. This is because the Conference Call Device (CCD) which bridges the conference call in MSC1 is not compatible with ACELP, and can only operate with G.711 at 64 kbps. Therefore, a second transcoding must be performed in GW1 to convert the voice signal back to ACELP for transport to MS2. This setup exists today, and is only a slight problem since two transcodings do not excessively degrade the speech quality.

The problem becomes more obvious when the first call is established between MS1 and a wireline telephone in the PSTN. ACELP is used between MS1 and the terminating gateway (GW4) where it is transcoded to G.711 because the PSTN cannot operate with ACELP. If a third party mobile station (MS3) joins in a conference call, there is still the requirement for MSC1 to fall back to G.711 because of the limitation of the CCD. Once again, this does not cause a serious problem between MS1 and MS3 because there is still only two transcodings. However, there is a much greater negative impact on voice quality between S1 and the PSTN telephone because there are three transcodings required: (1) ACELP-to-G.711 in MSC1; (2) G.711-to-ACELP in GW1; and (3) ACELP-to-G.711 in GW4.

There are no known prior art teachings of a solution to the aforementioned deficiency and shortcoming. In order to overcome these deficiencies and shortcomings, it would be advantageous to have a system and method of minimizing the number of voice transcodings during a conference call in a VoIP network in which TFO is utilized to control transcodings of the speech signal. The present invention provides such a system and method.

SUMMARY OF THE INVENTION

In one aspect, the present invention is a method of minimizing the number of transcodings of a speech signal during a conference call between a first mobile subscriber, a second subscriber, and a third subscriber when the call is transported over a packet-switched network, such as a Voice-over-IP (VoIP) network, in which Tandem Free Operation (TFO) is utilized to control transcoding of the speech signal. The method begins by establishing a first call between the first mobile subscriber and the second subscriber using TFO. A gateway connecting the second subscriber to the network (second gateway) sends a message to a gateway connecting the first subscriber to the network (first gateway). The message indicates the speech coding mode being utilized between the second subscriber and the second gateway. When a Mobile Switching Center (MSC) serving the first subscriber receives an input indicating that the third subscriber should be joined in the call, communications are established between the first gateway and a third gateway connecting the third subscriber to the network. This is followed by sending a message from the third gateway to the first gateway indicating the speech coding mode being utilized between the third subscriber and the third gateway. A Conference Call Device (CCD) in the MSC establishes a three-way call bridge which provides a first call path to the first subscriber, a second call path to the second subscriber, and a third call path to the third subscriber. The first call path, utilizing a speech coding mode supported by the CCD, goes to the transcoder located in the MSC. The first call path leg between the transcoder and the MS then utilize's speech coding supported by the MS. The second and third call paths go to the gateway connecting the first subscriber and utilize a speech coding mode supported by the CCD. The gateway connecting the first subscriber encodes the speech signal for the call leg to the second subscriber with the speech coding mode being utilized between the second subscriber and the second gateway. Likewise, the first gateway encodes the speech signal for the call leg to the third subscriber with the speech coding mode being utilized between the third subscriber and the third gateway.

In another aspect, the present invention is a system for minimizing the number of transcodings of a speech signal during a VoIP conference call in a packet-switched network which TFO is utilized. The system includes means for establishing a first call between the first mobile subscriber and the second subscriber using TFO, a first gateway connecting the first mobile subscriber to the network, a second gateway connecting the second subscriber, and a third gateway connecting the third subscriber. The second gateway includes means for sending a message to the first gateway indicating a speech coding mode being utilized between the second gateway and the second subscriber. The third gateway includes means for sending a message to the first gateway indicating a speech coding mode being utilized between the third gateway and the third subscriber. Upon initiation of a conference call joining the third subscriber, the system establishes communications between the first gateway and the third gateway. An MSC serving the first mobile subscriber includes a CCD for establishing a three-way call bridge. The call bridge provides a first call path to the first subscriber, a second call path to the second subscriber, and a third call path to the third subscriber. The second and third call paths go to the first gateway and use a speech coding mode supported by the CCD. The first gateway includes a first speech signal encoder for encoding the speech signal for the call leg to the second subscriber with the speech coding mode being utilized between the second gateway and the second subscriber. The first gateway also includes a second speech signal encoder for encoding the speech signal for the call leg to the third subscriber with the speech coding mode being utilized between the third gateway and the third subscriber.

In yet another aspect, the present invention is an access gateway for enabling a mobile subscriber to access a packet-switched network, such as a VoIP network, and to place a conference call between the first mobile subscriber, a second subscriber, and a third subscriber using TFO to control transcoding of a speech signal during the call. The access gateway includes a first connection to an MSC serving the first mobile subscriber which includes a CCD for establishing a call leg to the second subscriber and a call leg to the third subscriber over the connection to the access gateway. The access gateway also includes a second connection to a second gateway connecting the second subscriber to the network. The second connection receives a message from the second gateway indicating the speech coding mode being utilized between the second gateway and the second subscriber. A third connection within the access gateway receives a message from a third gateway connecting the third subscriber to the network. The message from the third gateway indicates a speech coding mode being utilized between the third gateway and the third subscriber. A first speech signal encoder within the access gateway encodes the call leg to the second subscriber with the speech coding mode being utilized between the second gateway and the second subscriber, and a second speech signal encoder within the access gateway encodes the call leg to the third subscriber with the speech coding mode being utilized between the third gateway and the third subscriber.

BRIEF DESCRIPTION OF THE DRAWINGS

The invention will be better understood and its numerous objects and advantages will become more apparent to those skilled in the art by reference to the following drawings, in conjunction with the accompanying specification, in which.

DETAILED DESCRIPTION OF EMBODIMENTS

For calls being routed over an IP-based network, H.323, H.225, and H.245 are a family of International Telecommunications Union (ITU) standards for packet-based multimedia (audio and video) communications systems. This family of standards permits calls between PC-based phone terminals (clients) in the IP network (LAN or WAN), or between client terminals and phone terminals in the Public Switched Telephone Network (PSTN) or the Public Land Mobile Network (PLMN) in an integrated network. An H.323 Gateway in the H.323 standard provides an interface between the IP network and the PSTN or PLMN, including transcoding of the speech signal.

Figure 1:
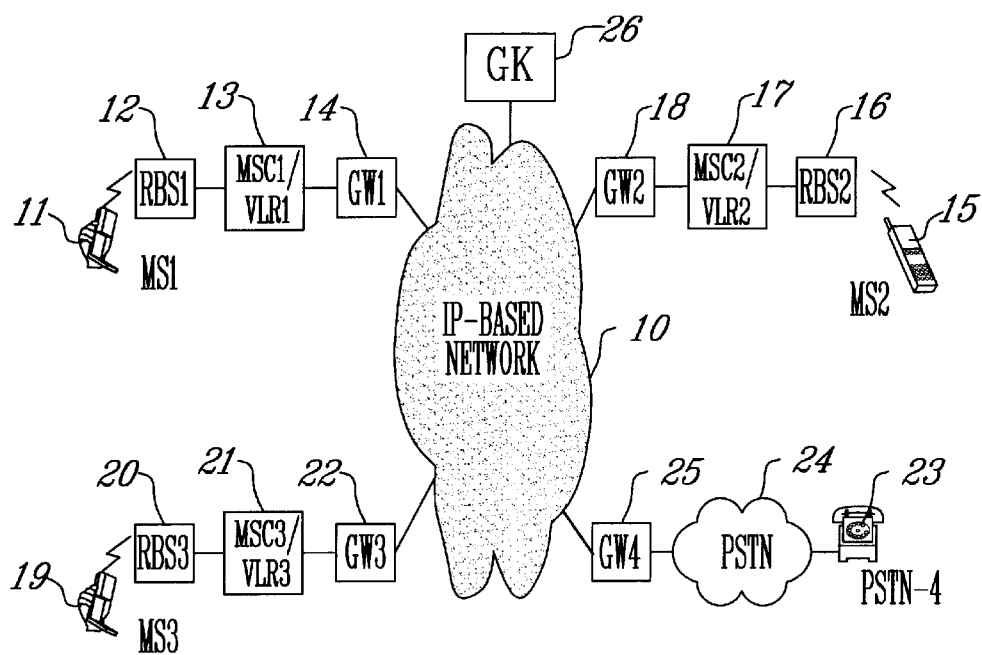
FIG. 1 is a simplified block diagram of an IP-based network suitable for implementing the present invention.

FIG. 1 is a simplified block diagram of an IP-based network 10 suitable for implementing the present invention. The network may be, for example, a VoIP network, an Asynchronous Transfer Mode (ATM) network, or other suitable packet-switched network. A first mobile station (MS1) 11 is connected to the network through a Radio Base Station (RBS1) 12, a Mobile Switching Center/Visitor Location Register (MSC1/VLR1) 13, and an access Gateway (GW1) 14. A second mobile station (MS2) 15 is connected to the network through RBS2 16, MSC2/VLR2 17, and Gateway (GW2) 18. A third mobile station (MS3) 19 is connected to the network through RBS3 20, MSC3/VLR3 21, and Gateway (GW3) 22. A telephone (PSTN-4) 23 connects to the network through the PSTN 24 and Gateway (GW4) 25. Finally, the network is served by a Gatekeeper (GK) 26.

Figure 2:
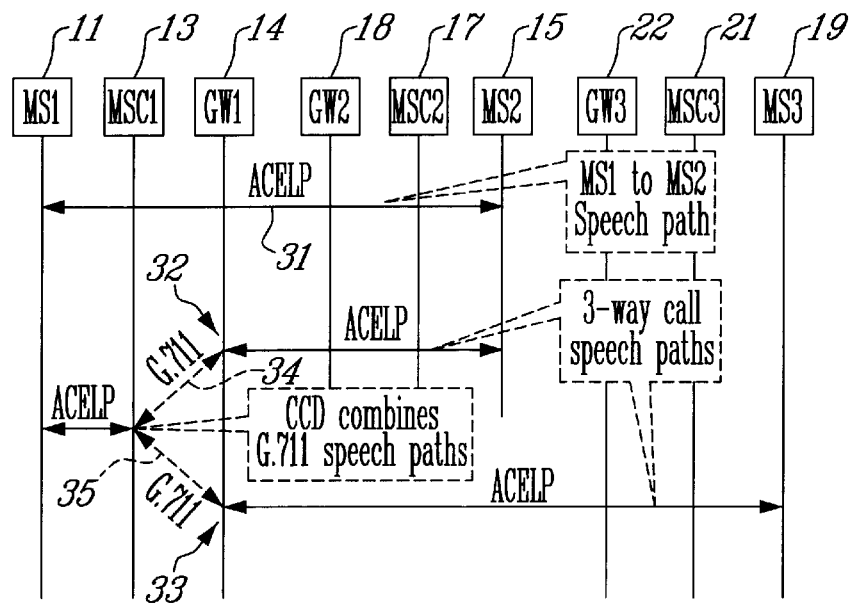
FIG. 2 (Prior Art) is an illustrative drawing illustrating the conversion of an ongoing MS-to-MS call to a three-way conference call by adding another MS utilizing existing procedures.

FIG. 2 is an illustrative drawing illustrating the conversion of an ongoing MS-to-MS call 31 between MS1 11 and MS2 15 to a three-way conference call by adding MS3 19 utilizing existing procedures. The MS-to-MS call 31 is set up utilizing Tandem Free Operation (TFO) in order to avoid repetitious coding and decoding of the speech signal. Therefore, ACELP coding is used all the way from the originating MS1 to the terminating MS2.

When a three-way conference call is initiated by MS1, a Conference Call Device (CCD) in MSC1 13 bridges the conference call and creates two call legs, a first leg 32 to MS2 and a second leg 33 to MS3. The CCD can only operate with G.711 coding at 64 kbps. Therefore, TFO (with ACELP) cannot be maintained when MS3 joins in the conference call. The call has to fall back to the G.711 mode in links 34 and 35 from MSC1 to GW1 for call legs 32 and 33, respectively. Both GW2 18 and GW3 22 inform GW1 14 that their terminating parties are using ACELP. Therefore, when the conference call starts, and the signals 34 and 35 coming in to GW1 from MSC1 change to G.711, GW1 transcodes each of the signals to ACELP before transporting them to their destinations. This procedure exists today, and is only a slight problem since two transcodings do not excessively degrade the speech quality.

Figure 3:
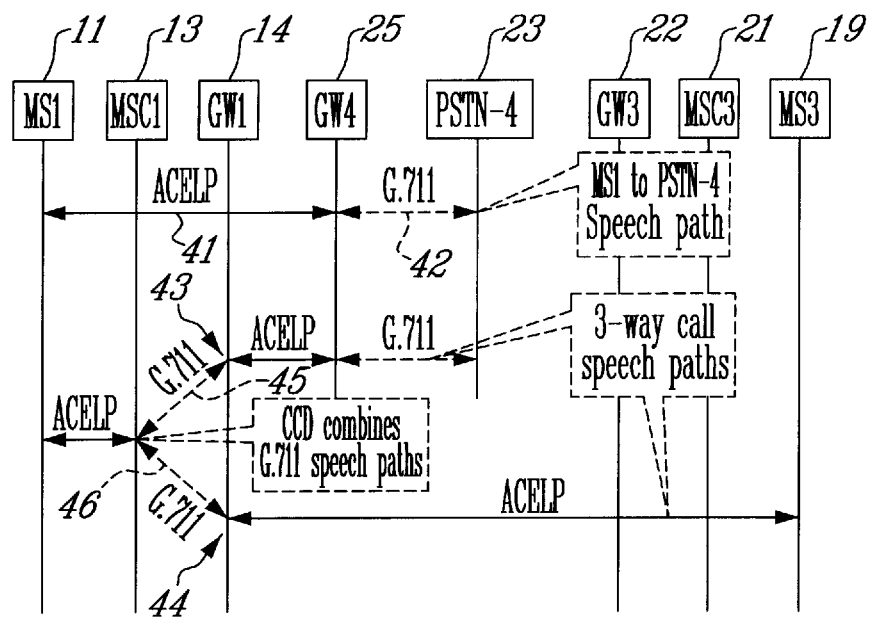
FIG. 3 (Prior Art) is an illustrative drawing illustrating the conversion of an ongoing MS-to-PSTN call to a three-way conference call by adding another MS utilizing existing procedures.

FIG. 3 is an illustrative drawing illustrating the conversion of an ongoing MS-to-PSTN call 41 to a three-way conference call by adding MS3 19 utilizing existing procedures. The problem with the prior art becomes more obvious in this instance when the first call is between MS1 11 and the wireline telephone PSTN-4 23. In the original call between MS1 and PSTN-4, TFO procedures are applied in order to use ACELP coding between MS1 and the terminating gateway (GW4) 25 where the speech signal is transcoded to G.711 because the PSTN cannot operate with ACELP. Therefore, the last leg of the call 42, from GW4 to PSTN-4 uses G.711 coding at 64 kbps.

When a three-way conference call is initiated by MS1, the CCD in MSC1 13 bridges the conference call and creates two call legs, a first leg 43 to PSTN-4 and a second leg 44 to MS3. As noted above, the CCD can only operate with G.711 coding at 64 kbps. Therefore, the call has to fall back to the G.711 mode in links 45 and 46 from MSC1 to GW1 for call legs 43 and 44, respectively. When the original call was set up between MS1 and PSTN-4, GW1 was instructed to use ACELP coding in the speech signal sent to GW4. In addition, GW3 22 informs GW1 that its terminating party is using ACELP. Therefore, when the conference call starts, and the signals 45 and 46 coming in to GW1 from MSC1 change to G.711, GW1 transcodes each of the signals to ACELP before transporting them toward their destinations. This works well for MS3 which is utilizing ACELP coding. However, PSTN-4 is not using ACELP, and another transcoding must be performed in GW4 to convert the signal to G.711 which is usable by the PSTN. Thus, there are three transcodings required for call leg 43: (1) ACELP-to-G.711 in MSC1; (2) G.711-to-ACELP in GW1; and (3) ACELP-to-G.711 in GW4. This additional transcoding has a serious negative impact on voice quality between MS1 and PSTN-4.

Figure 4:
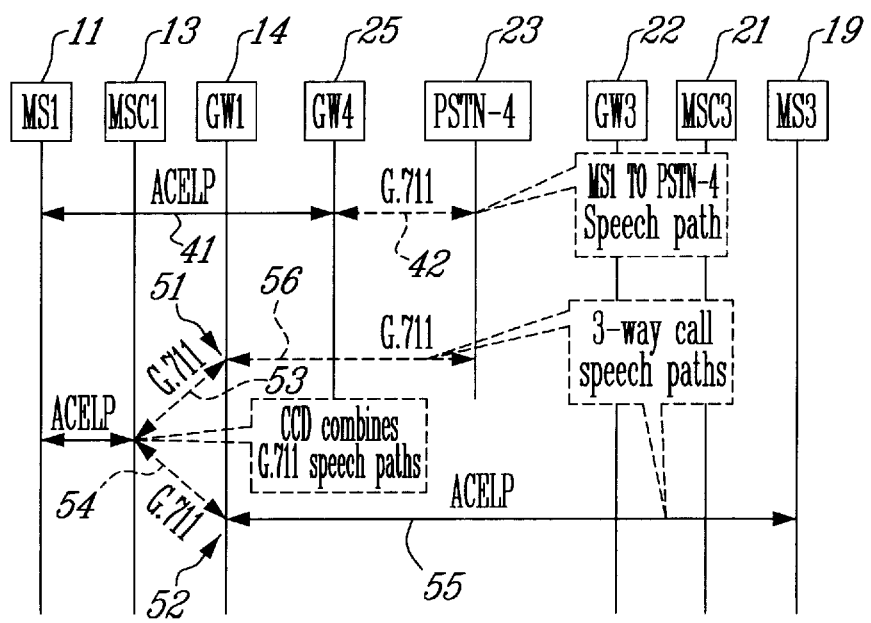
FIG. 4 is an illustrative drawing illustrating the conversion of an ongoing MS-to-PSTN call to a three-way conference call by adding another MS in accordance with the teachings of the present invention.

FIG. 4 is an illustrative drawing illustrating the conversion of the ongoing MS-to-PSTN call 41 to a three-way conference call by adding MS3 19 in accordance with the teachings of the present invention. When the conference call is initiated, the CCD in MSC1 13 bridges the conference call and creates two call legs, a first leg 51 to PSTN-4 23 and a second leg 52 to MS3 19. As noted above, the CCD can only operate with G.711 coding at 64 kbps. Therefore, the call has to fall back to the G.711 mode in links 53 and 54 from MSC1 to GW1 for call legs 51 and 52, respectively. GW3 22 informs GW1 14 that its terminating party (MS3) is using ACELP. Additionally, GW4 25 is modified in the present invention to inform GW1 that its terminating party (PSTN-4) is using G.711. Therefore, GW1 converts the signal 55 going to GW3 to ACELP, but leaves the signal 56 going to GW4 in G.711. Thus, the PSTN leg 51, which formerly would have been converted from G.711 to ACELP in GW1, is not converted, but is passed on in the G.711 format. Therefore, the entire leg, from the CCD bridge in MSC1 to PSTN-4 utilizes G.711 at 64 kbps.

Figure 5A:
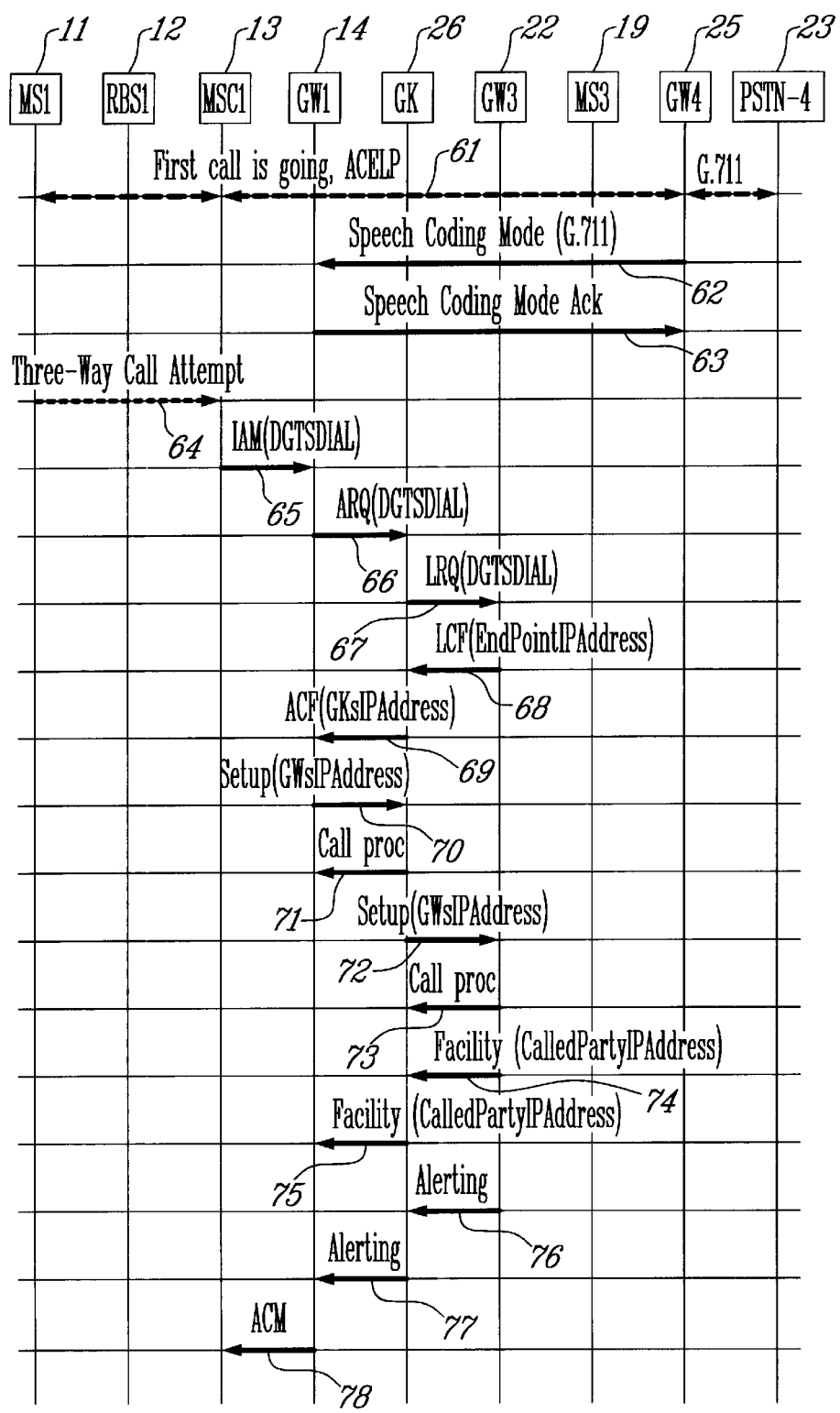
FIGS. 5A–5B are a signaling diagram illustrating the flow of signaling messages when setting up the three-way conference call in accordance with the procedures illustrated in FIG. 4.
Figure 5B:
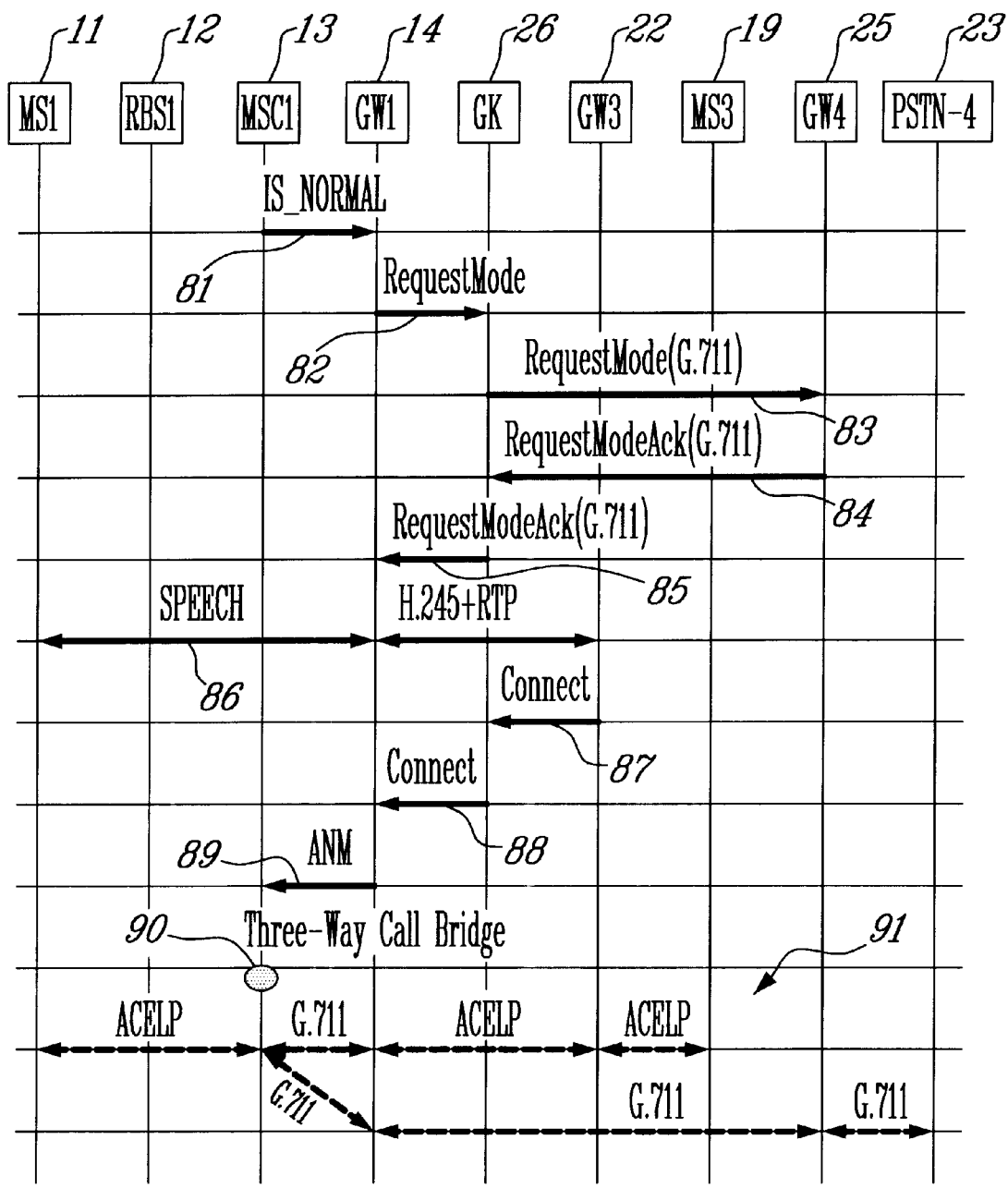

FIGS. 5A–5B are a signaling diagram illustrating the flow of signaling messages when setting up the three-way conference call in accordance with the procedures illustrated in FIG. 4. At 61, a call is ongoing between MS1 11 and PSTN-4 23 using TFO procedures in order to use ACELP coding all the way from MS1 to GW4 25. Therefore, the call passes through GW1 as ACELP. When MS1 first establishes the TFO link with PSTN-4, GW4 passes the speech mode being utilized between GW4 and PSTN-4 to GW1. This information is passed in a new Speech Coding Mode message 62 which includes an indication that the terminating part of the call uses G.711 coding. GW1 then returns a Speech Coding Mode Acknowledgment message 63. This information is used by GW1 later when the conference call starts, and the signal coming in to GW1 changes to G.711.

At 64, MS1 initiates a multi-party TFO call attempt to MS3 over the air interface. At 65, MSC1 analyzes the dialed digits and routes the call to a predetermined H.323 gateway (GW1) 14 using an Integrated Services Digital Network User Part (ISUP) Initial Address Message (IAM). GW1 requests access to the IP-based network by sending an Admission Request Query (ARQ) 66 to its serving gatekeeper (GK) 26. The ARQ message contains the digits dialed as destination information. The GK, using the digits dialed, tries to locate a gateway capable of handling the call to MS3. The method illustrated in the example of FIG. 5 is an H.323 Location Request Query (LRQ) 67 which may be multicasted to neighboring gatekeepers. At 68, GW3 responds with a Location Confirmation (LCF) message which includes GW3's IP address. The GK then grants admission by sending an Admission Confirmation (ACF) message 69 to GW1.

A Setup message 70, which includes a fastStart parameter, is then sent from GW1 14 to the GK 26. The fastStart parameter is needed for the fast connect H.323 procedure and contains GW1's IP address required for the H.245 and Real Time Protocol (RTP) channel establishment. The GK returns a Call Proceeding message 71 to GW1. The GK then propagates the setup to GW3 by sending a Setup message 72 with GW1's IP address. GW3 returns a Call Proceeding message 73 to the GK. A Facility message 74 is then sent from GW3 to the GK which forwards it at 75 to GW1. The Facility message includes the fastStart parameter describing MS3's H.245 and RTP IP address. Alerting messages are then sent from GW3 to the GK at 76, and from the GK to GW1 at 77. GW1 translates the Alerting message to an ISUP Address Complete Message (ACM) 78 and sends it to MSC1 which establishes a through connection in the group switch. At this point, GW1 starts to set up an H.245 connection with GW4 25. The process then moves to FIG. 5B.

Before the speech path between MS1 and MS3 is set up, MSC1 sends an IS_NORMAL message 81 to GW1 to fall back the speech codec between MSC1 and GW1 to G.711 for the original call between MS1 and PSTN-4. This is so that the CCD in MSC1 can bridge the conference call among subscribers MS1, MS3, and PSTN-4. Upon reception of the IS_NORMAL message, GW1 sends a Request Mode message 82 to the GK which forwards the request at 83 to GW4 to fall back the speech codec between GW1 and GW4 from ACELP to G.711. GW4 sends a Request Mode Acknowledgment 84 back to the GK with an extension indicating that the coding mode between GW1 and GW4 has been changed to G.711, and the GK forwards the Acknowledgment at 85 to GW1.

A full speech path 86 is then established between MS1 and GW3. The timing of this event is dependent upon the reception of the fastStart parameter at the incoming end. The G.711 speech codec is used between MSC1 and GW1 for the second call leg (between MS1 and MS3). A Connect message 87 is then sent from GW3 to the GK which propagates the Connect message at 88 to GW1. GW1 translates the Connect message to an ISUP Answer Message (ANM) 89 and sends it to MSC1. Upon receiving the ANM, MSC1 bridges the first call with the second call at 90 so that MS1, PSTN-4, and MS3 can communicate via the conference bridge.

The resulting configuration 91 is shown at the bottom of FIG. 5B. The connection between MS1 and MSC1 is ACELP. The CCD conference bridge in MSC1 requires that each call leg from MSC1 to GW1 be encoded with G.711. GW1 transcodes the voice signal back to ACELP for the call leg going to MS3, but retains the G.711 encoding for the call leg going to PSTN-4.

The method of the present invention is also applicable if a call is first established between two MSs, for example MS1 and MS2, and then PSTN-4 is conferenced in. Once again, GW1 is informed of the coding used by the terminating MS2 through the new Speech Coding Mode message. The extension to the Request Mode message sent during the call setup signaling instructs GW4 connected to the PSTN to fall back the speech codec between GW1 and GW4 to G.711. Thus, G.711 is utilized in the PSTN call leg from MSC1 to PSTN-4.

It is thus believed that the operation and construction of the present invention will be apparent from the foregoing description. While the method, apparatus and system shown and described has been characterized as being preferred, it will be readily apparent that various changes and modifications could be made therein without departing from the scope of the invention as defined in the following claims.

What is claimed is:

1. A method of minimizing the number of transcodings of a speech signal during a conference call between a first mobile subscriber, a second subscriber, and a third subscriber, said call being transported over a packet-switched network in which Tandem Free Operation (TFO) is utilized to control transcoding of the speech signal, said method comprising the steps of:

establishing a first call between the first mobile subscriber and the second subscriber using TFO;

sending a message from a gateway connecting the second subscriber to the network (second gateway) to a gateway connecting the first subscriber to the network (first gateway), said message indicating a speech coding mode being utilized between the second subscriber and the second gateway;

receiving an input in a Mobile Switching Center (MSC) serving the first subscriber indicating that the third subscriber should be joined in the call;

establishing communications between the first gateway and a third gateway connecting the third subscriber to the network;

sending a message from the third gateway to the first gateway indicating a speech coding mode being utilized between the third subscriber and the third gateway;

establishing a three-way call bridge by a Conference Call Device (CCD) in the MSC serving the first subscriber, said call bridge providing a first call path to the first subscriber, a second call path to the second subscriber, and a third call path to the third subscriber, the second and third call paths going to the first gateway and using a speech coding mode supported by the CCD;

encoding within the first gateway, the speech signal for the call leg to the second subscriber with the speech coding mode being utilized between the second subscriber and the second gateway; and encoding within the first gateway, the speech signal for the call leg to the third subscriber with the speech coding mode being utilized between the third subscriber and the third gateway.

2. The method of claim 1 wherein the second subscriber is a subscriber in the Public Switched Telephone Network (PSTN), and the step of encoding the speech signal for the call leg to the second subscriber includes encoding the speech signal with a speech coding mode utilized by the PSTN.

3. The method of claim 2 wherein the step of encoding the speech signal with a speech coding mode utilized by the PSTN includes encoding the speech signal with G.711 coding.

4. The method of claim 3 wherein the CCD supports the G.711 coding mode, and the step of encoding the speech signal with G.711 coding includes the steps of:

receiving the speech signal in the first gateway encoded with G.711 coding; and transmitting the speech signal to the second gateway encoded with G.711 coding.

5. The method of claim 2 wherein the third subscriber is a second mobile subscriber, and the step of encoding the speech signal for the call leg to the third subscriber includes encoding the speech signal with a speech coding mode utilized over an air interface radio link with mobile stations.

6. The method of claim 5 wherein the step of encoding the speech signal with a speech coding mode utilized over an air interface radio link with mobile stations includes encoding the speech signal with Algebraic Code Excited Linear Prediction (ACELP) coding.

7. The method of claim 6 wherein the CCD supports the G.711 coding mode, and the step of encoding the speech signal with ACELP coding includes the steps of:

receiving the speech signal in the first gateway encoded with G.711 coding;

transcoding the speech signal to ACELP coding; and transmitting the speech signal to the second gateway encoded with ACELP coding.

8. The method of claim 1 wherein the second subscriber is a second mobile subscriber, and the step of encoding the speech signal for the call leg to the second subscriber includes encoding the speech signal with a speech coding mode utilized over an air interface radio link with mobile stations.

9. The method of claim 8 wherein the third subscriber is a subscriber in the Public Switched Telephone Network (PSTN), and the step of encoding the speech signal for the call leg to the third subscriber includes encoding the speech signal with a speech coding mode utilized by the PSTN.

10. A system for minimizing the number of transcodings of a speech signal during a conference call between a first mobile subscriber, a second subscriber, and a third subscriber, said call being transported over a packet-switched network in which Tandem Free Operation (TFO) is utilized to control transcoding of the speech signal, said system comprising:

means for establishing a first call between the first mobile subscriber and the second subscriber using TFO;

a first gateway connecting the first mobile subscriber to the network;

a second gateway connecting the second subscriber to the network, said second gateway including means for sending a message to the first gateway indicating a speech coding mode being utilized between the second gateway and the second subscriber;

a third gateway connecting the third subscriber to the network, said third gateway including means for sending a message to the first gateway indicating a speech coding mode being utilized between the third gateway and the third subscriber;

means for establishing communications between the first gateway and the third gateway upon initiation of a conference call joining the third subscriber;

a Mobile Switching Center (MSC) serving the first mobile subscriber, said MSC including a Conference Call Device (CCD) for establishing a three-way call bridge, said call bridge providing a first call path to the first subscriber, a second call path to the second subscriber, and a third call path to the third subscriber, the second and third call paths going to the first gateway and using a speech coding mode supported by the CCD;

a first speech signal encoder within the first gateway for encoding the speech signal for the call leg to the second subscriber with the speech coding mode being utilized between the second gateway and the second subscriber; and a second speech signal encoder within the first gateway for encoding the speech signal for the call leg to the third subscriber with the speech coding mode being utilized between the third gateway and the third subscriber.

11. An access gateway for enabling a mobile subscriber to access a packet-switched network and to place a conference call between the first mobile subscriber, a second subscriber, and a third subscriber using Tandem Free Operation (TFO) to control transcoding of a speech signal during the call, said access gateway comprising:

a first connection to a Mobile Switching Center (MSC) serving the first mobile subscriber, said MSC including a Conference Call Device (CCD) for establishing over the first connection, a call leg to the second subscriber and a call leg to the third subscriber;

a second connection to a second gateway connecting the second subscriber to the network, said second connection for receiving a message from the second gateway indicating a speech coding mode being utilized between the second gateway and the second subscriber;

a third connection to a third gateway connecting the third subscriber to the network, said third connection for receiving a message from the third gateway indicating a speech coding mode being utilized between the third gateway and the third subscriber;

a first speech signal encoder for encoding the call leg to the second subscriber with the speech coding mode being utilized between the second gateway and the second subscriber; and a second speech signal encoder for encoding the call leg to the third subscriber with the speech coding mode being utilized between the third gateway and the third subscriber.

12. The access gateway of claim 11 wherein the second subscriber is a subscriber in the Public Switched Telephone Network (PSTN), and the call leg to the second subscriber is encoded with a speech coding mode utilized by the PSTN.

13. The access gateway of claim 12 wherein the speech coding mode utilized by the PSTN is G.711 coding.

14. The access gateway of claim 13 wherein the CCD supports the G.711 coding mode, and the first speech signal encoder includes:

means for receiving the call leg to the second subscriber encoded with G.711 coding; and means for transmitting the call leg to the second subscriber to the second gateway encoded with G.711 coding.

15. The access gateway of claim 12 wherein the third subscriber is a second mobile subscriber, and the call leg to the third subscriber is encoded with a speech coding mode utilized over an air interface radio link with mobile stations.

16. The access gateway of claim 15 wherein the speech coding mode utilized over an air interface radio link with mobile stations is Algebraic Code Excited Linear Prediction (ACELP) coding.

17. The access gateway of claim 16 wherein the CCD supports the G.711 coding mode, and the second speech signal encoder includes:

means for receiving the call leg to the third subscriber encoded with G.711 coding;

means for transcoding the call leg to the third subscriber to ACELP coding; and means for transmitting the call leg to the third subscriber to the gateway connecting the third subscriber encoded with ACELP coding.

18. The access gateway of claim 11 wherein the second subscriber is a second mobile subscriber, and the call leg to the second subscriber is encoded with a speech coding mode utilized over an air interface radio link with mobile stations.

19. The access gateway of claim 18 wherein the third subscriber is a subscriber in the Public Switched Telephone Network (PSTN), and the call leg to the third subscriber is encoded with a speech coding mode utilized by the PSTN.

* * * * *